UNITED STATES PATENT OFFICE.

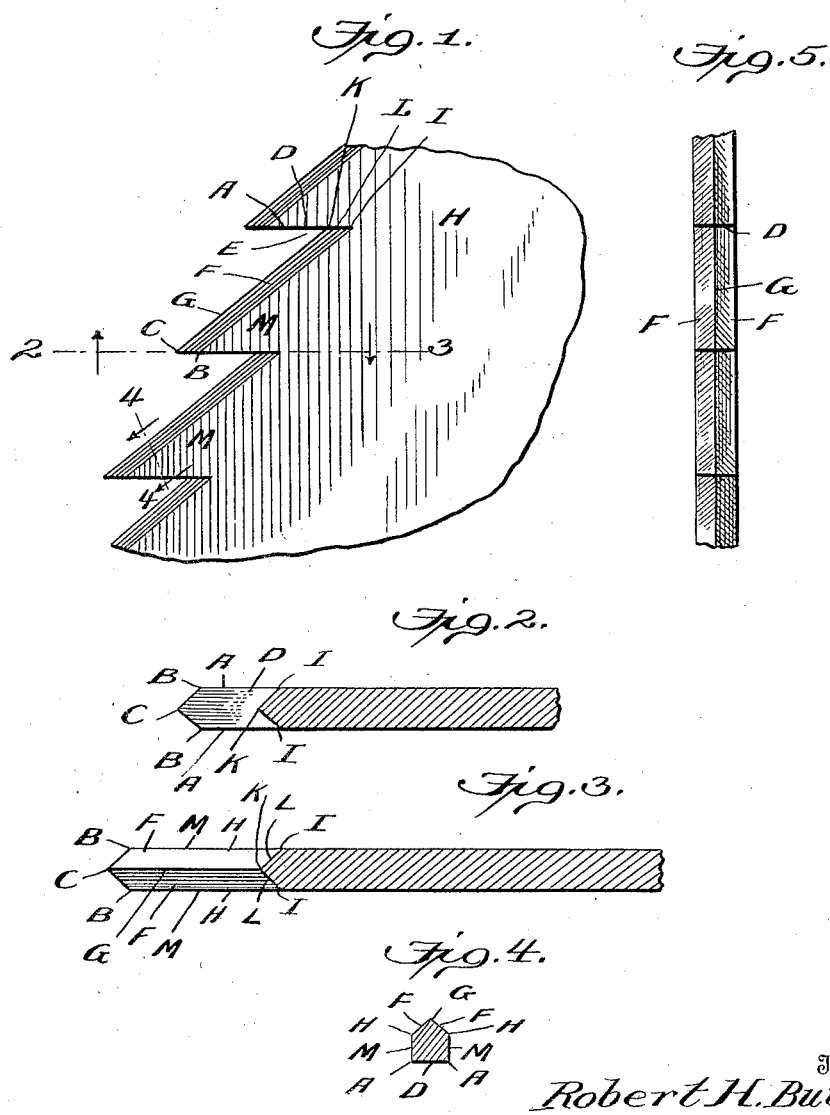

ROBERT H. BUTTERS, OF ATLANTA, GEORGIA, ASSIGNOR TO THE BUTTERS-CAMP MFG. CO., A CORPORATION OF GEORGIA.

GIN OR LINTER SAW.

1,346,396.  Specification of Letters Patent.  Patented July 13, 1920.

Original application filed November 28, 1916, Serial No. 133,923. Divided and this application filed March 6, 1917, Serial No. 152,894. Renewed December 3, 1919. Serial No. 342,304.

*To all whom it may concern:*

Be it known that I, ROBERT H. BUTTERS, a citizen of the United States, residing at Atlanta, in the county of Fulton and State of Georgia, have invented new and useful Improvements in Gin or Linter Saws, of which the following is a specification.

This application is a division of my pending application Serial No. 133,923, entitled "Gin or linter saw teeth and method of forming or renewing the same."

This invention relates to an improvement in gin or linter saws, and more particularly, to the teeth of such saws.

One object of the invention is to provide teeth for gin or linter saws which shall have much greater strength and a greater amount of stock than the teeth ordinarily employed, which, in general, shall be better adapted to the ginning or linting operations than teeth of the ordinary form and of which a greater number may be provided than is possible under conditions heretofore existing.

A further object of the invention is to provide teeth for linter saws which shall have longer cutting edges than the teeth ordinarily employed and by means of which the saws, both in view of the greater length of the cutting edges of the teeth and of the greater number of teeth with which they may be provided, shall have a substantially greater aggregate length of cutting edges than is possible with linter saws of the ordinary construction.

The accompanying drawings illustrate saw teeth in accordance with the invention, the saws and teeth being greatly exaggerated to promote clearness of illustration. The teeth selected for the purposes of illustration have sharply defined lateral cutting edges and are, therefore, adapted for linter saws but otherwise they include structural features, in accordance with the invention, which are applicable to the teeth of gin saws.

In the said drawings—

Figure 1 is a fragmentary side elevation of a saw showing several successive teeth thereof;

Fig. 2 is a bottom sectional plan view projected in the plane 2—3 of Fig. 1;

Fig. 3 is a normal plan view projected in the plane 2—3 of Fig. 1;

Fig. 4 is a cross-sectional view of one of the teeth in the plane 4—4 of Fig. 1; and Fig. 5 is a fragmentary front elevation of the saw.

Similar characters of reference designate corresponding parts throughout the several views.

The teeth shown have cutting edges A which are preferably parallel as far as points B and from said points B taper to a terminal point C. The edges A and the points B and C are in the plane of the base D of the tooth; and the base D of one tooth meets the upper face of the tooth next below, forming therewith an angular throat E. The upper face of each tooth has sides F inclined divergingly and symmetrically from a central apex G. Inwardly of the inclined faces F the teeth have the same thickness as the saw, and their sides M are co-planar with the sides of the saw. The side edges H of the inclined faces F extend parallel to the apex G and from the points B to points I in the rear of the point K whereat the apex G meets the base D of the tooth next above and between which and the terminal point C the apex G extends. The points I and K may be regarded as the angles of an imaginary triangle co-planar with the base D, two sides L of which triangle connect the point K with the points I. The point K, sides L and points I constitute the angular base line of the throat E which thus has a convex V-form. In practice, the distance between the terminal point of the tooth and the point K is about the same as the distance between the terminal point of an ordinary tooth and its transversely straight throat. The edges A have their inner terminals at the points I and, therefore, extend for a substantial distance inwardly beyond the point K; and said edges A are longer than the cutting edges of an ordinary tooth by the distance through which they extend inwardly beyond the point K. This lengthening of the cutting edges A is, however, without any effect in weakening the tooth at the throat owing to the facts that the tooth throughout the greater portion of its extent has the same thickness as the saw, and, hence, has an augmented amount of stock, and that the integral stock within the imaginary triangle I—K—I constitutes a reinforcement for the throat while providing for the inward extension of the edges A beyond the transverse line in which the point K is located. Stated more briefly, the base of each tooth is under-cut at the throat to provide for inward extensions of the cutting edges and for an integral reinforcement projecting outward beyond the inner terminals of the cutting edges.

Fig. 2 shows, in plan, the outline of the base of the tooth and the integral reinforcement I—K—I at the throat, providing for the under-cutting of the base at the inner end thereof and the inward extension or prolongation of the cutting edges A.

Fig. 3 shows, in plan, the outline of the upper face of the tooth and the integral reinforcement I—K—I.

Fig. 4 shows the tooth in cross-section in a plane perpendicular to the apex G and between the points B and K. From this figure, it will be apparent that the portion of the tooth between the sides M, and which constitutes by far the greater part of the material of the tooth, is of the same thickness as the saw and, hence, that the tooth, notwithstanding the inward prolongation of the cutting edges and the under-cutting of the base at the throat, has its stock greatly augmented, as compared with the stock of an ordinary tooth. It follows that the teeth may be cut substantially finer without undue sacrifice of strength or reduction of the length of the cutting edges than is possible with the constructions heretofore existing.

Aside from the obvious advantage in connection with the greater length of the cutting edges, further important advantages are secured in their relation to one another and to the saw and in the relation among said cutting edges, the terminal point and the upper face of the tooth. The cutting edges, as explained, are parallel throughout the greater portion of their extent and their parallel portions are in the same planes as the sides of the saw. This means that the teeth will have a closer and more efficient working fit between the bars of the usual linter grid and that their cutting edges will work closer to the seed while the liability of cutting or injuring the seed (which, as is well known, is of great value as a by-product) is greatly diminished. The actual point of the tooth may be regarded as the triangular pyramid whose imaginary base extends from the points B in a plane perpendicular to the apex G. This pyramid, it will be noted, has its lateral faces comparatively short but its base comparatively extensive along all of its sides, from which it follows that the terminal point of the tooth has much greater strength than the terminal point of the ordinary tooth which is a rectangular pyramid throughout its extent with comparatively long lateral faces and with comparatively short lines for any imaginary base located at a much greater distance from the terminal apex than the base B—G—B of the triangular pyramid which constitutes the point of the present tooth.

It will thus be seen that the present tooth as adapted for linter saws is not only more efficient than the ordinary saw tooth as regards the greater length of its cutting edges, but also as regards the relation of said edges to one another and to the sides of the saw whereby the edges cut close to the cottonseed with comparatively slight liability of injuring the seed, and as regards the greater strength of its terminal point, due to the form, proportions and relation to the tooth of the pyramidal stock which constitutes said point. These factors, together with the greatly increased intrinsic strength of the tooth throughout its extent, due to the augmented stock thereof and the reinforcement of its throat, and the capacity for cutting the teeth much finer and, hence, in substantially greater number than is possible with the constructions heretofore existing, provide for a saw which shall be more effectively adapted to the wearing and tearing work of linting cotton-seed than saws of the ordinary construction.

It will be obvious from the foregoing description that the pitch, angle, extent, proportions and number of the teeth may be varied as judgment may dictate and in accordance with the character of work or peculiar conditions of use.

While the need and value of the teeth will be most marked in linting operations, it will also be understood that the teeth will have great value and will be much superior to the ordinary teeth in the usual ginning operations, which, however, do not impose the wear and tear of linting operations, and do not require the same perfection, as regards the condition of the teeth.

The best method now known to me for the production of teeth of the character described is the method disclosed in my co-pending application Serial No. 133,923; and for the practice of this method, it is preferred to employ the machine disclosed in my co-pending application Serial No. 161,002.

I claim as my invention—

1. A linter saw whose teeth have each a base provided with a terminal point and lateral cutting edges which taper toward said terminal point from other points slightly in the rear thereof and an upper surface which extends from the base of the next preceding tooth, said base being undercut at its sides to provide for inward prolongations of said cutting edges.

2. A linter saw whose teeth have each side faces in the planes of the sides of the saw and a base provided with a terminal point and parallel lateral cutting edges in the planes of said side faces, said cutting edges tapering toward said terminal point from other points slightly in the rear thereof.

3. A linter saw whose teeth have a point in the form of a relatively short pyramid with relatively long base lines and a base in whose planes the terminal apex of said point lies, said base having lateral cutting edges which taper toward said terminal apex from points slightly in the rear thereof and extend between said last-named points and the throat of the tooth.

4. A linter saw whose teeth each have a point in the form of a relatively short pyramid with relatively long base lines and a base in whose plane the terminal apex of said point lies, said base having lateral cutting edges and being undercut at the throat of the tooth to provide for inward prolongations of said cutting edges, said cutting edges extending to points slightly in the rear of said apex and tapering from said points to said apex.

5. A linter saw whose teeth each have a base provided with lateral cutting edges, and an upper surface forming a throat with the base of the next preceding tooth, said upper surface having a central apex extending to said base and said base being undercut at its sides to provide for prolongation of its cutting edges inwardly beyond said apex.

6. A linter saw whose teeth each have side faces in the planes of the sides of the saw; a base having parallel lateral cutting edges in the planes of said side faces and a terminal point to which said cutting edges taper from points slightly in the rear thereof; and an upper surface having a central apex and sides inclined divergingly from said apex to said side faces, said apex extending to said terminal point and the side edges of said inclined sides extending to the points from which said cutting edges taper to said terminal point, said upper surface forming a throat with said base and said base being undercut at each side thereof at said throat to provide for inward prolongation of its cutting edges.

7. A gin or linter saw whose teeth have each a base and an upper surface which extends from the base of the next preceding tooth, said base being undercut at its sides to provide for inward prolongations of its lateral edges.

8. A gin or linter saw whose teeth have each side faces in the planes of the sides of the saw, a base subtending said side faces and a pyramidal terminal point for which said base provides a face and whose inclined sides extend continuously from the base of the next preceding tooth.

9. A gin or linter saw whose teeth have each a point in the form of a relatively short pyramid with relatively long base lines and a base which provides a face for said pyramid, said base being undercut at its sides to provide for inward prolongations of its lateral edges.

10. A gin or linter saw whose teeth have each a base and an upper surface forming a throat with the base of the next preceding tooth, said upper surface having a central apex extending continuously from said throat to said base.

11. A gin or linter saw whose teeth have each a base and an upper surface forming a throat for the base of the next preceding tooth, said upper surface having a central apex extending to said base, and said base being undercut at its sides to provide for prolongations of its lateral edges inwardly beyond said apex.

In testimony whereof I have hereunto set my hand in presence of two subscribing witnesses.

ROBERT H. BUTTERS.

Witnesses:
G. A. NICOLSON, Jr.,
REX B. MOONEY.